Patented Feb. 20, 1940

2,191,309

UNITED STATES PATENT OFFICE 2,191,309

REISSUED
APR 7- 1942

METHOD FOR THE SEPARATION OF CHEMICALLY MODIFIED ROSINS AND THEIR ESTERS INTO COMPONENTS

Joseph N. Borglin, Wilmington, Del., assignor to Hercules Powder Company, Wilmington, Del., a corporation of Delaware No Drawing. Application April 1, 1939,
Serial No. 265,549

9 Claims. (Cl. 260—107)

This invention relates to a method for the separation of chemically modified rosins and their esters into components, and more particularly the separation of chemically modified rosins and their esters into components by treatment with a selective solvent.

Due to the complexity of the chemical structure of rosin, treatments for the production of chemical modifications practically always result in products which are mixtures of two or more chemical compounds. The product may contain unchanged rosin or the rosin may be converted into two or more different materials, or both. The esterification of such a modified product produces a modified rosin ester which, similarly, is a mixture of chemically different esters. Likewise, esterification of rosin and then treatment to produce chemical modification, gives a product which is a mixture of chemically different esters.

Thus, for example, the hydrogenation of rosin may result in a mixture of unchanged rosin and dihydro-rosin. More complete hydrogenation results in a mixture of dihydro-rosin and tetrahydro-rosin. The production of a product which is entirely tetrahydro-rosin has so far proved impossible. The esterification of a hydrogenated rosin results in a mixture of rosin esters. Likewise, the hydrogenation of rosin esters results in a mixture of ordinary rosin ester and dihydro-rosin ester or a mixture of dihydro-rosin ester and tetrahydro-rosin ester.

The separation of the chemically different components of the chemically modified rosins has heretofore been practically impossible, and the various commercial products have been complex mixtures of compounds of different chemical structure. No successful method for separating the components of such mixtures has been developed, in spite of the fact that it has been fully realized that such separation would be of great value from a commercial standpoint, as well as from a scientific standpoint.

Now, I have found that I can separate chemically modified rosins and chemically modified rosin esters into their components by a method which is relatively simple, efficient and adaptable to commercial operation. I accomplish this by treating a chemically modified rosin or a chemically modified rosin ester with a substance selected from the group of substances now known to the art to be selective solvents for the visible and latent color bodies of rosin.

The process in accordance with this invention consists of treating a modified rosin or modified rosin ester with a solvent which is a selective solvent for the color bodies of rosin, separating the selective solvent from the undissolved component of the modified rosin or rosin ester and recovering the component of the modified rosin dissolved therein, as, for example, by evaporating the selective solvent. This process can be repeated as many times as necessary to produce the desired separation of the components.

In carrying out this method, the modified rosin or rosin esters may or may not be first dissolved in a solvent therefor which is immiscible with the selective solvent which is used. Ordinarily, it will be found convenient to use a solvent, particularly if the modified rosin or rosin ester treated is a solid at the temperature of treatment. When it is desired to use a solvent for the modified rosin or modified rosin ester, the procedure in accordance with this invention will consist of dissolving the modified rosin or modified rosin ester in the solvent, contacting the solution so formed with a selective rosin color body solvent, immiscible therewith, separating the two solutions thus formed, and recovering a component of the modified rosin or modified rosin ester from each solution as, for example, by evaporating the respective solvents, preferably under reduced pressure. This procedure may be repeated as many times as desired.

After separating the modified rosin or modified rosin ester into components by the above procedure, each component may be further purified by crystallization from suitable solvents, fractionation under reduced pressure, contacting with an absorbent, such as, fuller's earth, kieselguhr, activated carbon etc.

The modified rosin or modified rosin ester which I may treat in accordance with this invention may be any rosin or rosin ester which has been treated to modify its chemical structure, so that the resultant product is a mixture of two or more chemically different substances. The hydrogenation of rosin or a rosin ester in the presence of a suitable catalyst according to methods known to the art produces such a modified rosin or modified rosin ester. The esterification of a hydrogenated rosin, likewise, produces such an ester.

The polymerization of rosin or a rosin ester to increase its molecular weight and melting point by treatment with a polymerizing agent, for example, volatile metal halides, as, boron trifluoride, zinc chloride, stannic chloride, aluminum chloride, ferric chloride; mineral acids, as, sulfuric acid, phosphoric acid; fuller's earth; hydrogen fluoride; acid salts, as sodium acid sulfate, etc.; metallic silicon; hydro fluoro-boric acid; etc., according to methods known to the art, produces such a modified rosin or modified rosin ester. Such a modified rosin ester may also be produced by esterifying a polymerized rosin.

Again, the treatment of rosin or a rosin ester with a suitable catalyst, as, for example, a hydrogenation catalyst, as nickel, as nickel chromite, platinum, palladium, etc., at an elevated temperature of, for example, from about 150° C. to about 200° C. and without reaction between the rosin or rosin ester and any added substance, to produce an intra- and inter-molecular rearrangement within the hydrocarbon nucleus of the rosin or rosin ester with a reduction in the apparent unsaturation as disclosed in the co-pending application of Edwin R. Littmann, Serial No. 84,877, filed June 12, 1936, produces a modified rosin or modified rosin ester which may be treated in accordance with this invention. Such modified rosins and modified rosin ester will hereinafter be termed "Hyex" rosins and "Hyex" rosin esters, respectively. The esterification of a Hyex rosin also produces such a chemically modified rosin ester.

The modified rosins which I treat in accordance with this invention may be any grade of wood or gum rosin which has been treated to modify its chemical structure so that the product is a mixture of two or more chemically different materials. The esters of the modified rosins which I treat may be produced by the esterification of modified rosins or may be produced by the chemical modification of ordinary esters of rosins, and may be esters of either a monohydric or a polyhydric alcohol. Thus, esters of rosins with monohydric alcohols, such as, for example, methanol, ethanol, propanol, butanol, amyl alcohol, cetyl alcohol, lauryl alcohol, stearyl alcohol, furfuryl alcohol, hydrofurfuryl alcohol, abietanol, hydroabietanol, phenol, benzyl alcohol, etc., or with polyhydric alcohols, such as, for example, ethylene glycol, diethylene glycol, triethylene glycol, glycerol, sorbitol, mannitol, erythritol, pentaerythritol, etc., may be treated by my new method.

The selective solvent which I use in accordance with this invention may be any of the various selective solvents for the visible and latent color bodies of rosins and rosin esters heretofore known. Thus, I may use furfural, furfuryl alcohol, a chlorohydrin, as, ethylene chlorohydrin, propylene chlorohydrin, etc., aniline, phenol, resorcinol, ethylene glycol, propylene glycol, butylene glycol, diethylene glycol, trimethylene glycol, glycerol, butyl glycerol, ethyl formate, methyl acetate, methyl formate, methyl orthonitrobenzoate, methyl furoate, alkyl formate, monoacetin, diacetin, triacetin, ethylene glycol monoacetate, methanol, hydroxyl alkyl amine, as triethanolamine, a solution of oxalic acid in water or in methanol, ethanol or other lower aliphatic alcohol, ethylene glycol monoethyl ether, or other immiscible glycol ether, ethylene glycol monoacetate, or other immiscible glycol ester, methyl thiocyanate, ethyl thiocyanate, acetonitrile, acetic acid, acetic anhydride, p-chloroaniline, resorcinol plus hydrosulphite, ethylene glycol diacetate, glycerol diaectate, resorcinol monoacetate, resorcinol diacetate, phenyl acetate, furfuryl acetate, ethylidine diacetate, n-propyl furoate, ethyl glycollate, methyl citrate, ethyl tartrate, ethyl malonate, methyl maleate, dimethyl phthalate, benzyl formate, monobutyrin, ethyl carbonate, methyl lactate, diethyl oxalate, methyl adipate, hydroxyhydroquinone triacetate, methyl chlorocarbonate, propylene glycol monoacetate, hydroquinone diacetate, catechol monoacetate, guaiacyl acetate, methyl glutarate, ethyl oxalate, benzyl acetate, diethyl glutacoate, ethyl lactate, diethyl phthalate, ethyl anisate, methyl salicylate, methyl cinnamate, methyl mandelate, methyl acrylate, ethyl oxamate, methyl succinate, ethyl propiolate, ethyl malate, methoxy-benzaldehyde, guaiacol, anisidin, nitroanisol, dichloroethyl ether, methoxy acetic acid, methyoxybenzyl alcohol, liquid sulfur dioxide, nitromethane, etc., or mixtures of such refining agents which are chemically non-reactive, etc.

The solvent in which I may dissolve the modified rosin or modified rosin ester before contacting it with a selective solvent may be any solvent for the modified rosin or modified rosin ester which is immiscible and non-reactive with the selective solvent used. Thus, I may use a petroleum hydrocarbon solvent, such as, for example, gasoline, petroleum ether, a normally gaseous petroleum hydrocarbon held in liquid phase by elevated pressure, low temperature, or both. The concentration of the modified rosin or modified rosin ester in such a solution may be within the range of about 5% to about 80% by weight, and desirably within the range of about 15% to about 30% by weight.

The temperature at which the process in accordance with my invention may be carried out is dependent upon the selective solvent employed and will be within the range of about $-40°$ C. to about $+60°$ C. In any case the temperature used will be such that the selective solvent is a liquid under the pressure used.

In the embodiment of my process in which a chemically modified rosin or a chemically modified rosin ester is dissolved in a solvent therefor before it is contacted with a selective solvent, the solution so formed may have a concentration within the range of about 5% to about 40%, by weight. Usually I prefer to use a solution having a concentration within the range of about 10 to about 25% by weight.

The number of washes employed in my process may be varied in accordance with the results desired, and it will be appreciated that the greater the number of washes given the sharper will be the separation of the components of the chemically modified rosin or chemically modified rosin ester treated.

As illustrations of the practical adaptation of the method in accordance with this invention, I may cite the following:

EXAMPLE I

Wood rosin polymerized by treatment in solution in ethylene dichloride solution with aluminum chloride, washed with hydrochloric acid and then with water, and recovered by evaporation of the solvent was treated. One hundred grams of this polymerized rosin was dissolved in 300 grams of gasoline. This solution was washed with 75 cc. of furfural, with 25 parts by volume of furfural and then with two portions of 10 cc. of furfural. The furfural wash solutions were combined and evaporated to recover the component of the polymerized rosin dissolved therein. Likewise, the gasoline solution was evaporated to recover the component remaining therein.

The two components thus separated from the original polymerized rosin and a sample of the original polymerized rosin were tested by making them into core oils and observing the time required for the core oil to crystallize. The core oil made from the original polymerized rosin had crystallized in about 105 days, showing it to be non-crystalline. The component of the polymerized rosin recovered from the gasoline solution after treatment with furfural crystallized from core oil in five days showing it to be unpolymerized rosin. On the other hand, the component of the original polymerized rosin recovered from the furfural had not crystallized from core oil in one hundred and forty days, as compared with about one hundred and five days for the original polymerized rosin, showing it to be more highly polymerized than the original rosin. These core oil tests demonstrate that the process in accordance with this invention separated the rosin polymerized by treatment with aluminum chloride, into two components one of which is a highly polymerized and the other an ordinary unpolymerized rosin.

Example II

Wood rosin, polymerized by treatment with 95% sulfuric acid and having a drop melting point of 103.5° C. and grading H in color, was treated. Three 250 gram portions of this polymerized rosin were dissolved separately in 750 grams of gasoline. Each of the resulting solutions was washed counter-currently at room temperature with one 50 cc. and six 25 cc. portions of furfural in such a manner that each solution of polymerized rosin received four washes with furfural. The furfural wash solutions were combined to recover the component of the polymerized rosin dissolved therein. Each of the three gasoline solutions was evaporated separately under reduced pressure to recover the component of the polymerized rosin remaining therein. The various components thus obtained were analyzed with the results given in Table 1 below.

Table 1

|  | Grams yield | Color grade | Drop melting point |
|---|---|---|---|
|  |  |  | ° C. |
| Original polymerized rosin |  | H | 103.5 |
| Rosin from gasoline solution No. 1 | 52 | M | 100 |
| Rosin from gasoline solution No. 2 | 71 | K | 100 |
| Rosin from gasoline solution No. 3 | 86 | H+ | 99.5 |
| Fraction from combined furfural fractions | 35 | B | 103 |

An examination of the above table shows that the treatment of the polymerized rosin solution with furfural separated the original polymerized rosin into two principal components, one of which is lighter colored and of a lower degree of polymerization than the other.

Example III

A hydrogenated I wood rosin saturated to the extent of 60% was used in this experiment. Three portions of 300 grams each were counter-currently washed with five portions of 100 cc. each of furfural. The resulting gasoline solutions and the combined furfural solutions were evaporated under reduced pressure. The products thus secured showed the following results on analysis:

Table 2

|  | Refractive index | Hydrogenation | Yield |
|---|---|---|---|
|  |  | Percent | Percent |
| Original hydrogenated rosin | 1.5255 | 60 |  |
| Fraction from gasoline solution No. 1 | 1.5218 | 78 | 44.5 |
| Fraction from gasoline solution No. 2 | 1.5230 | 74 | 66.2 |
| Fraction from gasoline solution No. 3 | 1.5243 | 68 | 81.1 |
| Fraction from combined furfural fractions | 1.538 | 22 |  |

An inspection of the above table shows that the furfural wash removed unhydrogenated or slightly hydrogenated rosin from the hydrogenated rosin contained in the gasoline solution, so that the saturation of the hydrogenated rosin recovered from the gasoline solution was increased to as high as 78%. As a comparison it will be noted that the rosin recovered from the furfural was saturated to the extent only of 22%. The yields in Table 2 show the per cent rosin recovery from each gasoline solution.

Example IV

A gasoline solution containing 13% Hyex wood rosin was prepared. Three portions of this solution, each 300 parts by volume, were counter-currently washed with one portion of 500 parts by volume and six portions of 25 parts by volume, respectively, of 85% aqueous phenol, whereby each rosin solution received four washes. The gasoline solutions, and the combined phenol solutions were evaporated under reduced pressure to recover the rosin fractions dissolved therein. Analysis of the products so recovered showed them to have the following physical properties:

Table 3

|  | Drop melting point | Refractive index | Specific rotation | Yield |
|---|---|---|---|---|
|  | ° C. |  |  | Percent |
| Original Hyex rosin | 83 | 1.5426 |  |  |
| Fraction from gasoline solution No. 1 | 72 | 1.5375 | +52.3 | 17.5 |
| Fraction from gasoline solution No. 2 | 78 | 1.5376 | +53.4 | 22.5 |
| Fraction from gasoline solution No. 3 | 80.5 | 1.5400 | +55.4 | 31.5 |
| Fraction from aqueous phenol | 86.0 | 1.539 | +61.4 | 21.6 |

An examination of the above table shows that the treatment separated the original Hyex rosin into two components having quite different physical characteristics from one another. A comparison of the properties of the component from gasoline solution 3 and those of the component from the aqueous phenol brings this out. Thus, the aqueous phenol component had a definitely higher melting point, a lower refractive index, and a higher specific rotation, than the fraction from the gasoline solution.

Example V

A gasoline solution containing 20% Hyex rosin was prepared. Three portions of 300 parts by volume each of the solution were counter-currently washed with one portion of furfural of fifty parts by volume and four portions of furfural of thirty parts by volume, so that each of the gasoline solutions received four counter-current washes. The gasoline solutions and the combined furfural wash solutions were evaporated under reduced pressure, and the properties of the rosin components recovered determined by analysis. Their characteristics are given in Table 4 which follows:

Table 4

|  | Drop melting point | Acid No. | Refractive index | Specific rotation | Yield |
|---|---|---|---|---|---|
|  | ° C. |  |  |  | Per cent |
| Fraction from gasoline solution No. 1 | 75.5 | 156.5 | 1.5371 | +50.0 | 21.6 |
| Fraction from gasoline solution No. 2 | 77.5 | 160.5 | 1.5378 | +54.5 | 25.6 |
| Fraction from gasoline solution No. 3 | 82.0 | 163.0 | 1.5382 | +53.4 | 32.8 |
| Fraction from furfural solution | 90.0 | 161.5 | 1.5527 | +60.2 | 15.2 |

In the above Table 4, as in Table 3 of Example IV, the characteristics of the separated components show them to be different types of rosin.

EXAMPLE VI

Three portions of a 20% solution of hydrogenated I grade wood rosin in gasoline of 200 grams each were counter-currently washed with methyl thiocyanate at 25° C., so that each gasoline solution received five washes with 20 cc. of methyl thiocyanate. The three refined gasoline solutions and the combined thiocyanate solutions were evaporated under reduced pressure to recover the rosin fractions dissolved in each. The analyses and yields of these fractions of the hydrogenated rosin, as well as that of the original hydrogenated rosin, are given in Table 5 which follows:

Table 5

|  | Refractive index | Percent hydrogenation | Yield | |
|---|---|---|---|---|
|  |  |  | Grams | Percent |
| Original hydrogenated rosin | 1.5262 | 62.5 | | |
| Rosin from gasoline solution No. 1 | 1.5230 | 72 | 26 | 21.9 |
| Rosin from gasoline solution No. 2 | 1.5253 | 67 | 38.5 | 32 |
| Rosin from gasoline solution No. 3 | 1.5248 | 69 | 42.0 | 35 |
| Rosin from combined methyl thiocyanate wash solution | 1.5335 | 30 | 11.5 | 9.6 |

An inspection of the data of Table 5 shows that the treatment with the methyl thiocyanate solution separated the hydrogenated rosin having a saturation of 62.5% of theoretical into fractions having saturations within the range of 67-72% of theoretical on one hand and 30% of theoretical on the other. Thus, the thiocyanate tended to selectively dissolve unhydrogenated rosin from the more highly hydrogenated rosin which remained in the gasoline solution.

EXAMPLE VII

Three portions of a 20% solution of dihydroabietyl alcohol in gasoline of 50 grams each were counter-currently washed with methyl thiocyanate at 0° C., so that each gasoline solution received five washes with 10 cc. portions of methyl thiocyanate. The three refined gasoline solutions and the combined thiocyanate solutions were evaporated under reduced pressure to recover the dissolved fractions. The analyses and yields of these fractions of the dihydroabietyl alcohol are given in Table 6.

Table 6

|  | Hydroxyl | Alcohol | Weight recovered D.H.A. |
|---|---|---|---|
|  | Per cent | Per cent | Grams |
| Original dihydroabietyl alcohol | 4.75 | 81 | |
| Dihydroabietyl alcohol from gasoline solution No. 1 | 4.4 | 43 | 0.7 |
| Dihydroabietyl alcohol from gasoline solution No. 2 | 4.65 | 60 | 2.0 |
| Dihydroabietyl alcohol from gasoline solution No. 3 | 4.7 | 80 | 11.8 |
| Dihydroabietyl alcohol combined methyl thiocyanate solution | 4.8 | 91.5 | 12.3 |

An inspection of the data of Table 6 shows that the original sample of dihydroabietyl alcohol was 81% alcohol, while the fraction recovered from the combined methyl thiocyanate solution was 91.5% dihydroabietyl alcohol. As compared with this the fraction recovered in the No. 1 gasoline solution was only 75% dihydroabietyl alcohol. Thus, the treatment in accordance with this invention definitely concentrated the alcoholic portion of the original dihydroabietyl alcohol in the methyl thiocyanate fraction.

EXAMPLE VIII

Three portions of 100 grams each of a 20% solution of dihydroabietyl alcohol in gasoline were washed counter-currently with aniline at 0° C., so that each gasoline solution received five washes with 10 cc. portions of aniline. The three refined gasoline solutions and also the combined aniline solutions were evaporated under reduced pressure to recover the dissolved products. The analyses and yields of these products are given in Table 7 which follows:

Table 7

|  | Hydroxyl | Alcohol | D.H.A. weight alcohol recovered |
|---|---|---|---|
|  | Percent | Percent | Grams |
| Original dihydroabietyl alcohol | 4.75 | 81 | |
| Dihydroabietyl alcohol from gasoline solution No. 1 | 4.4 | 75 | 9.5 |
| Dihydroabietyl alcohol from gasoline solution No. 2 | 4.65 | 78.5 | 16.5 |
| Dihydroabietyl alcohol from gasoline solution No. 3 | 4.7 | 80 | 19.2 |
| Dihydroabietyl alcohol from combined aniline solutions | 4.75 | 82 | 11.3 |

An examination of the above data shows that aniline, like the methyl thiocyanate of the Example VII selectively dissolved the dihydroabietyl alcohol, yielding a fraction which was materially purer than the original sample.

EXAMPLE IX

A glycerol ester of hydrogenated wood rosin (hydroabietic acid) was dissolved in gasoline to a 20% concentration. Three portions of 200 cc. each of this 20% solution were counter-currently washed at 25° C. so that each portion received six washes with 20 cc. portions of 85% phenol. The three refined gasoline solutions and the combined phenol solution were evaporated under reduced pressure. The analyses and yields of the fractions thus recovered are given in Table 8.

Table 8

|  | Refractive index at 20° C. | Yield |
|---|---|---|
|  |  | Grams |
| Original glycerol ester | 1.5303 | |
| Ester from gasoline solution No. 1 | 1.5303 | 25 |
| Ester from gasoline solution No. 2 | 1.5305 | 35 |
| Ester from gasoline solution No. 3 | 1.5314 | 37 |
| Ester from combined phenol extract | 1.5316 | |

Since it is known that the less saturated products have higher refraction indices, a comparison of the refractive index of the original ester with that of the fraction secured from the combined phenol extract shows that the latter contains less saturated material than the original, and is a definitely different material.

EXAMPLE X

The methyl ester of hydrogenated wood rosin (dihydroabietic acid) was treated following exactly the same procedure as in Example IX with the exception that furfural, instead of 85% phenol, was used as a selective solvent. The analyses and yields of the recovered fractions of the ester are given in Table 9.

Table 9

| | Refractive index | Saturation | Yield |
|---|---|---|---|
| | | Percent | Grams |
| Original methyl hydro-abietate | 1.5177 | 40 | |
| Ester from gasoline solution No. 1 | 1.5148 | 50 | 28 |
| Ester from gasoline solution No. 2 | 1.5163 | 43 | 31 |
| Ester from gasoline solution No. 3 | 1.5164 | 43 | 38 |
| Ester from combined furfural ext | 1.528 | 22 | |

An examination of the data given in Table 9 shows that the hydrogenated abietyl ester was concentrated in the gasoline solution #1 while the unhydrogenated ester was concentrated in the furfural extract.

EXAMPLE XI

The glycerol ester of Hyex wood rosin was dissolved in gasoline to produce a 20% solution. Three portions of 200 grams each of this solution were counter-currently washed with furfural at room temperature (25° C.) so that each portion received washes with 6 20 cc. portions of furfural. The gasoline solutions and the combined furfural washes were then evaporated under reduced pressure. The analyses and yields of the recovered products are given in Table 10.

Table 10

| | Refractive index | Yield |
|---|---|---|
| | | Grams |
| Original glyceryl ester of Hyex rosin | 1.5442 | |
| Ester from gasoline solution No. 1 | 1.5432 | 25 |
| Ester from gasoline solution No. 2 | 1.5435 | 38 |
| Ester from gasoline solution No. 3 | 1.5454 | 39 |
| Ester from combined furfural ext | 1.5552 | 21 |

A comparison of the refractive indices of the original ester, the fraction recovered from the #1 gasoline solution and the fraction recovered from the furfural solution, shows that the original ester of Hyex rosin has been separated into two chemically different fractions by the furfural wash.

It will be understood that the above examples and details of operation are given by way of illustration only, and that the scope of my invention as herein broadly described and claimed is in no way limited thereby.

This application forms a continuation-in-part of my application, Serial No. 160,725, filed August 24, 1937, entitled "Separation of chemically modified rosin and their esters into components."

What I claim and desire to protect by Letters Patent is:

1. The method of separating polymerized rosin into its components, which comprises dissolving polymerized rosin in a solvent therefor, contacting the solution so formed with a selective rosin color-body solvent immiscible with the said solution, separating the selective solvent therefrom and recovering a component of the polymerized rosin from each of the resulting solutions.

2. The method of separating polymerized rosin into its components, which comprises dissolving polymerized rosin in a solvent therefor, contacting the solution so formed with a selective rosin color-body solvent immiscible with the said solution, separating the selective solvent therefrom and recovering a component of the polymerized rosin from each of the resulting solutions, by evaporating the solvent.

3. The method of separating polymerized rosin into its components, which comprises dissolving polymerized rosin in a solvent therefor, contacting the solution so formed with furfural, separating the selective solvent therefrom and recovering a component of the polymerized rosin from each of the resulting solutions by evaporating the solvent.

4. The method of separating polymerized rosin into its components, which comprises dissolving polymerized rosin in a solvent therefor, contacting the solution so formed with phenol, separating the selective solvent therefrom and recovering a component of the polymerized rosin from each of the resulting solutions by evaporating the solvent.

5. The method of separating polymerized rosin into its components, which comprises dissolving polymerized rosin in a solvent therefor, contacting the solution so formed with an alkyl thiocyanate, separating the selective solvent therefrom and recovering a component of the polymerized rosin from each of the resulting solutions by evaporating the solvent.

6. The method of separating polymerized rosin into its components, which comprises dissolving polymerized rosin in a petroleum hydrocarbon solvent, contacting the solution so formed with a selective rosin color-body solvent immiscible with the said solution, separating the selective solvent therefrom and recovering a component of the polymerized rosin from each of the resulting solutions by evaporating the solvent.

7. The method of separating polymerized rosin into its components, which comprises dissolving polymerized rosin in a petroleum hydrocarbon solvent, contacting the solution so formed with furfural, separating the furfural therefrom and recovering a component of the polymerized rosin from each of the resulting solutions by evaporating the solvent.

8. The method of separating polymerized rosin into its components, which comprises dissolving polymerized rosin in a petroleum hydrocarbon solvent, contacting the solution so formed with phenol, separating the phenol therefrom and recovering a component of the polymerized rosin from each of the resulting solutions by evaporating the solvent.

9. The method of separating polymerized rosin into its components, which comprises dissolving polymerized rosin in a petroleum hydrocarbon solvent, contacting the solution so formed with an alkyl thiocyanate, separating the alkyl thiocyanate therefrom and recovering a component of the polymerized rosin from each of the resulting solutions by evaporating the solvent.

JOSEPH N. BORGLIN.